US008095517B2

(12) United States Patent
Sandoval et al.

(10) Patent No.: US 8,095,517 B2
(45) Date of Patent: Jan. 10, 2012

(54) METHOD AND SYSTEM FOR POLICY-BASED PROTECTION OF APPLICATION DATA (75) Inventors: Andrew Leonard Sandoval, Leander, TX (US); Yariv Kaplan, Austin, TX (US); Roy Israel Shamir, Austin, TX (US); Wei Lu, Austin, TX (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 244 days.

(21) Appl. No.: 11/672,894

(22) Filed: Feb. 8, 2007

(65) Prior Publication Data
US 2008/0196082 A1    Aug. 14, 2008

(51) Int. Cl.
G06F 7/00     (2006.01)
G06F 17/00    (2006.01)
(52) U.S. Cl. .......................................... 707/695; 726/30
(58) Field of Classification Search .................. None
See application file for complete search history.

(56) References Cited

U.S. PATENT DOCUMENTS

| | | | |
|---|---|---|---|
| 6,256,620 B1* | 7/2001 | Jawahar et al. ........................ 1/1 |
| 6,341,373 B1* | 1/2002 | Shaw ........................... 717/173 |
| 6,470,450 B1* | 10/2002 | Langford et al. .............. 713/182 |
| 6,502,193 B1* | 12/2002 | Barber ............................... 726/4 |
| 6,519,700 B1* | 2/2003 | Ram et al. ....................... 713/193 |
| 2001/0007133 A1* | 7/2001 | Moriconi et al. .............. 713/201 |
| 2003/0028788 A1* | 2/2003 | Cuenod et al. ................. 713/189 |
| 2003/0177485 A1* | 9/2003 | Waldin et al. .................. 717/169 |
| 2004/0002882 A1* | 1/2004 | Safa ..................................... 705/7 |
| 2004/0010701 A1* | 1/2004 | Umebayashi et al. ........ 713/193 |
| 2004/0162876 A1* | 8/2004 | Kohavi ............................ 709/203 |
| 2005/0055574 A1* | 3/2005 | Chmaytelli ................... 713/201 |
| 2005/0188227 A1* | 8/2005 | Jooste ........................... 713/201 |
| 2005/0216746 A1* | 9/2005 | Saika ............................ 713/182 |
| 2006/0101463 A1* | 5/2006 | Poisner ......................... 718/100 |
| 2006/0259981 A1* | 11/2006 | Ben-Shoshan .................. 726/27 |
| 2006/0277341 A1* | 12/2006 | Johnson ......................... 710/200 |
| 2007/0094145 A1* | 4/2007 | Ta et al. ........................... 705/59 |
| 2007/0168707 A1* | 7/2007 | Kern et al. ......................... 714/6 |
| 2007/0177740 A1* | 8/2007 | Nakajima ..................... 380/277 |

\* cited by examiner

Primary Examiner — Fred I Ehichioya
Assistant Examiner — Augustine Obisesan
(74) Attorney, Agent, or Firm — SNR Denton US LLP (57) ABSTRACT

A method and system for protecting an application's operational data are described. According to one aspect of the invention, an administrator interacts with a policy distribution server to generate an operational data protection policy. Next, the policy distribution server generates a data protection application embodying the policy. Various computing devices download and execute the data protection application. The data protection application controls how various applications access data storage objects and data interfaces, based on the operational data protection policy.

14 Claims, 5 Drawing Sheets

METHOD AND SYSTEM FOR POLICY-BASED PROTECTION OF APPLICATION DATA

FIELD OF THE INVENTION

The invention relates to methods and systems for establishing and using policies to control and protect the operational data of a computer application.

BACKGROUND

Figure 1:
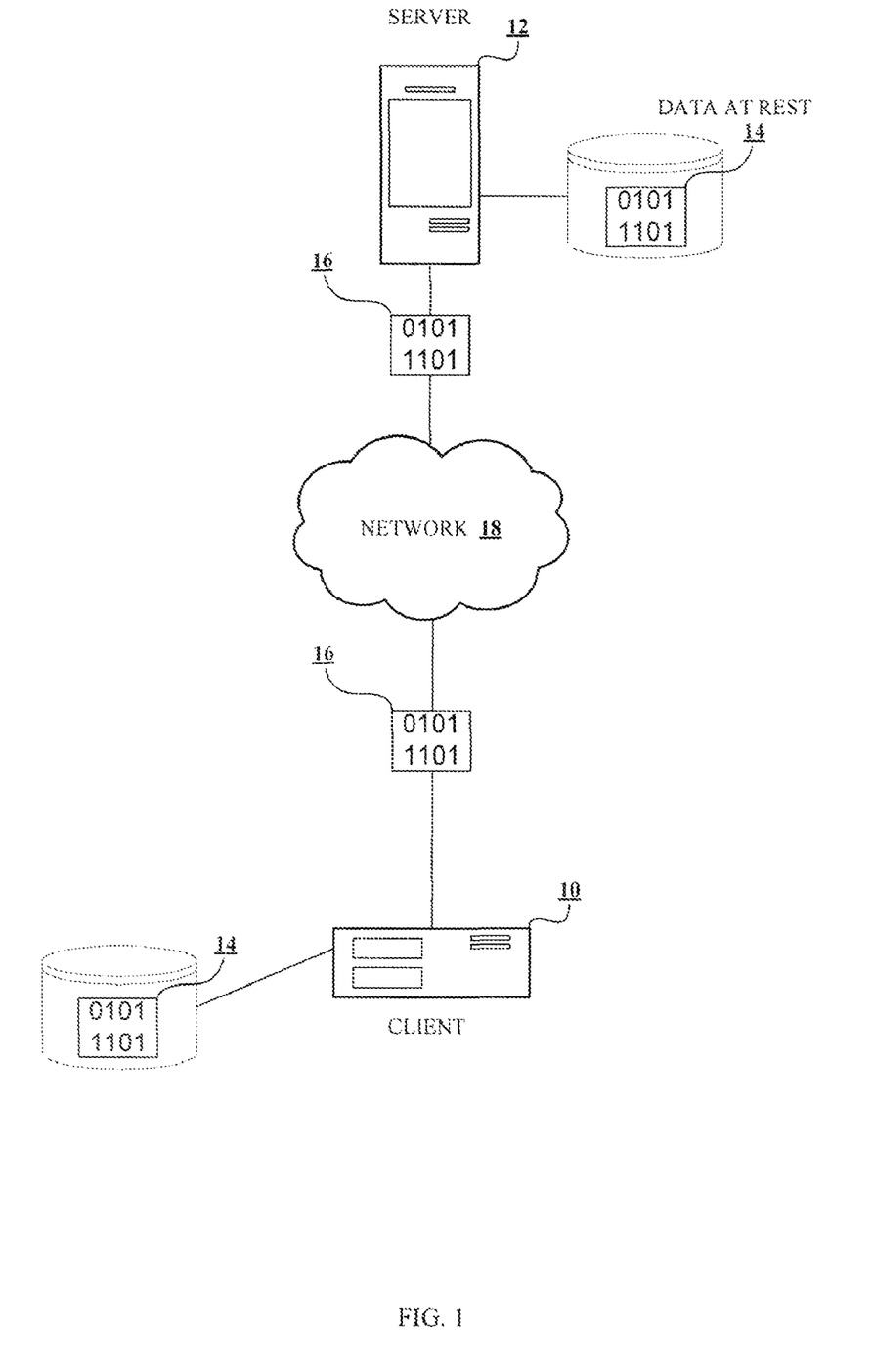
FIG. 1 illustrates an example of a computing environment for which operational data may be at risk.

Generally, a computer application's data is in one of three states: data at rest, data at transit, or data at operation. For example, as illustrated in FIG. 1, data stored in long-term storage at a client device 10 or at a server device 12 is data in a state of rest 14. Similarly, data being exchanged over a network 18 between the client device 10 and the server device 12 is data at transit 16. A variety of technologies and techniques exist for controlling and protecting data at rest and data at transit. For example, data at rest is often protected by a file system's user access policy. Furthermore, various techniques exist for encrypting data at rest, thereby preventing unauthorized access to the data. Similarly, network access policies and virtual private networks exist to control access to and protect data at transit. Encryption techniques, such as secure sockets layer (SSL) also help to protect data at transit.

Although data at rest and data at transit are well protected, it is often the case that data at operation are not well protected. For example, in an on-line shopping application, data representing a shopping list may be encrypted when the data are sent from a shopping cart device to a store server (e.g., in transit), and the corresponding transaction record may be well protected at the store database (e.g., at rest). However, during the shopping session, a user's input to the shopping list at the local computer may be wide open to third-party snooping. Similarly, a confirmation message received from the store server, which acknowledges and provides details of the transaction, may also be wide open to third-party snooping. In another example, with a remote medical diagnosis application, a patient's personal and medical information may be well protected by authentication, access control and encryption, when such data is at rest or in transit. Nonetheless, such information when processed and displayed by the application on the local device may be exposed to third-party prying. Accordingly, improved techniques for protecting operational data are desirable.

SUMMARY

A method and system for protecting an application's operational data are described. According to one aspect of the invention, an administrator interacts with a policy distribution server to generate an operational data protection policy. Next, the policy distribution server generates a data protection application embodying the policy. Various computing devices download and execute the data protection application. The data protection application controls how various applications access data storage objects and data interfaces, based on the operational data protection policy.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION

Reference will now be made in detail to an implementation consistent with the present invention as illustrated in the accompanying drawings. Wherever possible, the same reference numbers will be used throughout the drawings and the following description to refer to the same or like parts. Although discussed with reference to these illustrations, the present invention is not limited to the implementations illustrated therein. Hence, the reader should regard these illustrations merely as examples of embodiments of the present invention, the full scope of which is measured only in terms of the claims following this description.

Consistent with one embodiment of the invention, operational data are protected from unauthorized access by first identifying the places where an application stores operational data and the particular data interfaces used by the application to enable access to the operational data. Next, the operational data stored in those places as well as any data requests initiating at a particular data interface are tracked and monitored. Finally, through various means, operational data are controlled and protected by granting and restricting access to the operational data in accordance with an administratively defined operational data protection policy.

In the context of the present invention, operational data are data associated with an active user session, or an executing application. One advantage of the invention is that by monitoring and tracking the operational data as it is generated during the user session or during execution of an application, the operational data protection policy ensures that the operational data, including all copies, are removed from the computer on which they are generated at the end of a user session, or when the application terminates. Consequently, a subsequent user will be unable to recall operational data from a previous user's computing session. Furthermore, applications such as spyware or malware, which are designed to collect personal information about a user of a computer without their informed consent, are prevented from accessing an application's protected operational data. For instance, according to an embodiment of the invention, access to operational data stored in a keyboard event buffer or a display screen buffer (particular types of data storage objects) may be controlled and limited, thereby preventing an unauthorized keylogger or screen grabber application from accessing potentially sensitive information. Operational data may include (but is not limited to): data representing a software component; data representing a web page associated with a universal resource identifier (URI); data representing a file; data representing or associated with a graphical user interface object (GUI), such as a window or pop-up dialog box; data that is input or displayed in connection with a form; and data that is located in a buffer, such as a keyboard or display screen buffer.

One aspect of the invention involves identifying and then monitoring all potential storage mechanisms (referred to herein as data storage objects) associated with the operational data of a particular application. Possible data storage objects where operational data may reside include (but are not limited to): files (e.g., of the file system); memory (including system, video and other peripheral memory); operating system data structures, such as clipboards, messages, display data buffer and spool, etc.; and inter-component communications such as Component Object Model (COM) objects, Dynamic Data Exchange (DDE) objects, sockets, keyboard event and display screen buffers. In addition to identifying various data storage objects, the data access methods and data interfaces are identified. For example, if one or more functions, methods, or procedures are used to access data associated with a particular application or data storage object, those functions, methods, or procedures are identified. Accordingly, the data protection policy may define various access privileges and restrictions for individual data access methods or data interfaces.

Consistent with one embodiment of the invention, an administrator establishes a system-wide policy for the protection of operational data associated with one or more software applications executing on various computing devices. Advantageously, the policy may be defined at a granular level, such that access privileges and restrictions can be varied by application, data storage objects, data access methods, data interfaces, universal resource identifiers (URI's) and so forth. Once the policy is defined, an executable application embodying the system-wide policy is generated—referred to herein as a data protection application. For example, in one embodiment of the invention, a single executable application is generated to embody the operational data protection policy for several software applications. Alternatively, the operational data protection policy may be embodied in separate applications that correspond with the various applications targeted for protection. In yet another embodiment, the operational data protection policy may be embodied in the target application itself, either directly, or indirectly through a linking process (e.g., a dynamically linked library (DLL) function). In yet another embodiment, the operational data protection policy may be embodied in a group of software applications such that each data protection application is associated with a particular data storage object, data access method or data interface. In any case, once generated, the data protection application or applications embodying the operational data protection policy are made available to various computing devices on a policy distribution server, which serves the policy (e.g., the data protection application embodying the policy) to various computing devices within a particular domain of the distribution server.

The computing devices within the domain of the distribution server download the executable application embodying the operational data protection policy, and execute the data protection application. In one embodiment of the invention, the execution of a software application on a computer triggers the downloading and execution of the data protection application. For example, if a user attempts to "open" or execute a web browser application, this may trigger the downloading and execution of the data protection application. However, in one embodiment of the invention, before downloading the data protection application from the distribution server, the computer may determine whether the most recent version of the data protection application already resides on the computer. If so, downloading the data protection application is not necessary, and the execution of the browser application will automatically trigger the execution of the data protection application, if the data protection application is not already executing.

Once the data protection application, which implements the operational data protection policy, is executed on a particular computing device, the policy is in essence activated on that particular computing device. Accordingly, the data protection application monitors active processes to determine when certain target applications are executed. In this context, a target application is any application for which there exists one or more rules associated with the operational data protection policy.

Figure 2:
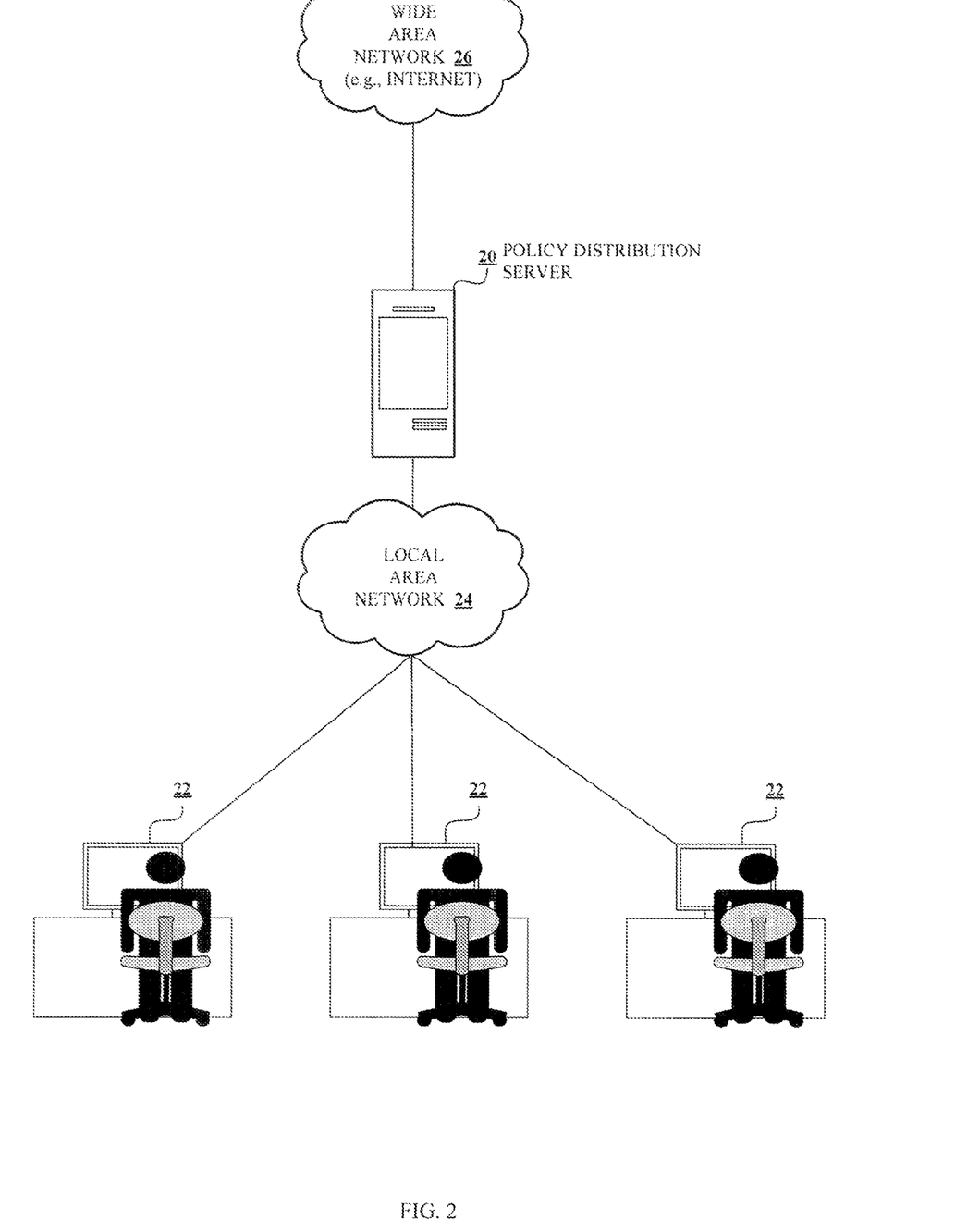
FIG. 2 illustrates an example of a computing environment in which an embodiment of the invention may be deployed.

FIG. 2 illustrates an example of a computing environment in which an embodiment of the invention may be deployed. As illustrated in FIG. 2, a policy distribution server 20 is coupled to several work station computers 22 by means of a local area network (LAN) 24. In addition, the policy distribution server 20 and the workstation computers 22 are coupled to a wide area network (WAN) 26, for example, such as the Internet. It will be appreciated by those skilled in the art that the particular computer environment shown in FIG. 2 is presented as one example, and the present invention may be used in a wide variety of computing environments with varied configurations, without departing from the spirit of the invention. Furthermore, although the particular computing devices illustrated in FIG. 2 are described as workstation computers, it will be appreciated by those skilled in the art that the present invention may be implemented to work with nearly any computing device, to include: desktop computers, laptop computers, notebook computers, personal computers, personal digital assistants, mobile devices and smart phones, etc.

Figure 3:
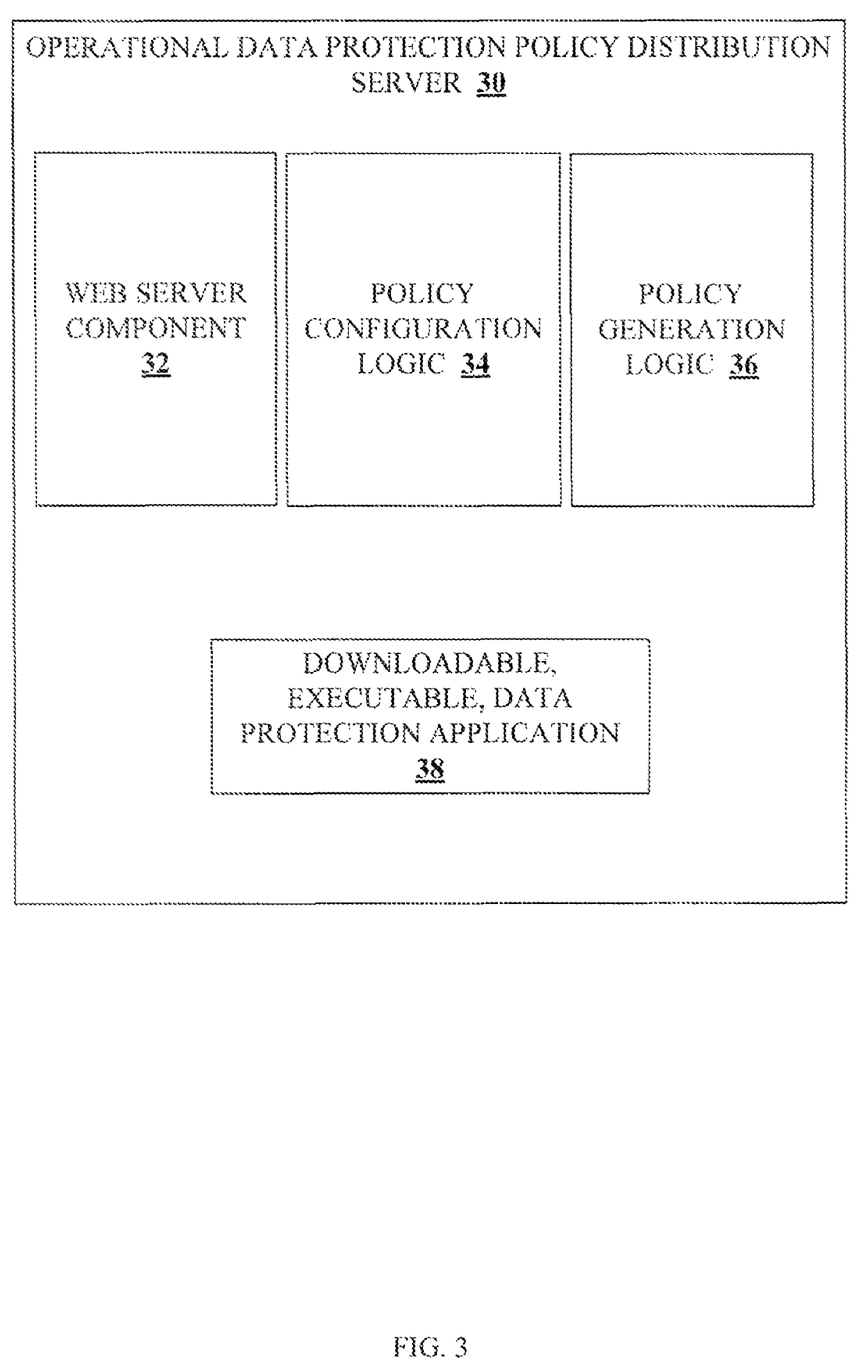
FIG. 3 illustrates an example of a policy distribution server, according to an embodiment of the invention.

As illustrated in FIG. 3, in one embodiment of the invention, the policy distribution server 30 includes a web server component 32, policy configuration logic 34, and policy generation logic 36. Accordingly, in one embodiment of the invention, an administrator accesses the policy distribution server 30 from a conventional web browser application executing on a remote computing device. The administrator can then configure and generate a data protection application 38 implementing an operational data protection policy via the distribution server's web server component 32. For example, the policy configuration logic 34 in conjunction with the web server component 32 may present the administrator with a number of configuration options and various policy settings by means of one more graphical user interface objects, such as drop down menus, selectable buttons, dialog boxes, etc. By manipulating the various graphical user interface objects, the administrator is able to set the operational data protection policy. Once the operational data protection policy is set, the administrator instructs the policy generation logic 36 of the distribution server 30 to generate the data protection application 38 based on the established operational data protection policy. Accordingly, the policy generation logic 36 generates a downloadable, executable, data protection application that implements the operational data protection policy.

In one embodiment of the invention, the policy configuration logic 34 is designed to enable the administrator to define various policies on a granular level. For example, the data protection policy may differ for various Universal Resource Identifiers (URIs), such that the particular rules for a URI deemed likely to be associated with sensitive data are more restrictive than other URIs. Similarly, the data protection policy may differ between applications, such that the rules associated with one application, such as a web browser application, may be more or less restrictive than the rules associated with another application, such as an instant messaging application. Furthermore, the data protection policy may differ amongst various data storage objects, data access methods, or data interfaces. For example, the rules for an application may restrict a user from "cutting" or "copying" data to a data storage object, such as an operating system's clipboard application, thereby preventing another application from discovering potentially sensitive data via access to the clipboard. However, the same application may permit data to be communicated to another data storage object, such as the operating system's print spooler. Furthermore, as described in greater detail below, a variety of protection methods may be defined for each data storage object, data access method or data interface. For example, the rules for an application may restrict one data access method, such as "cutting" data, but allow another data access method, such as "copying" data.

Figure 4:
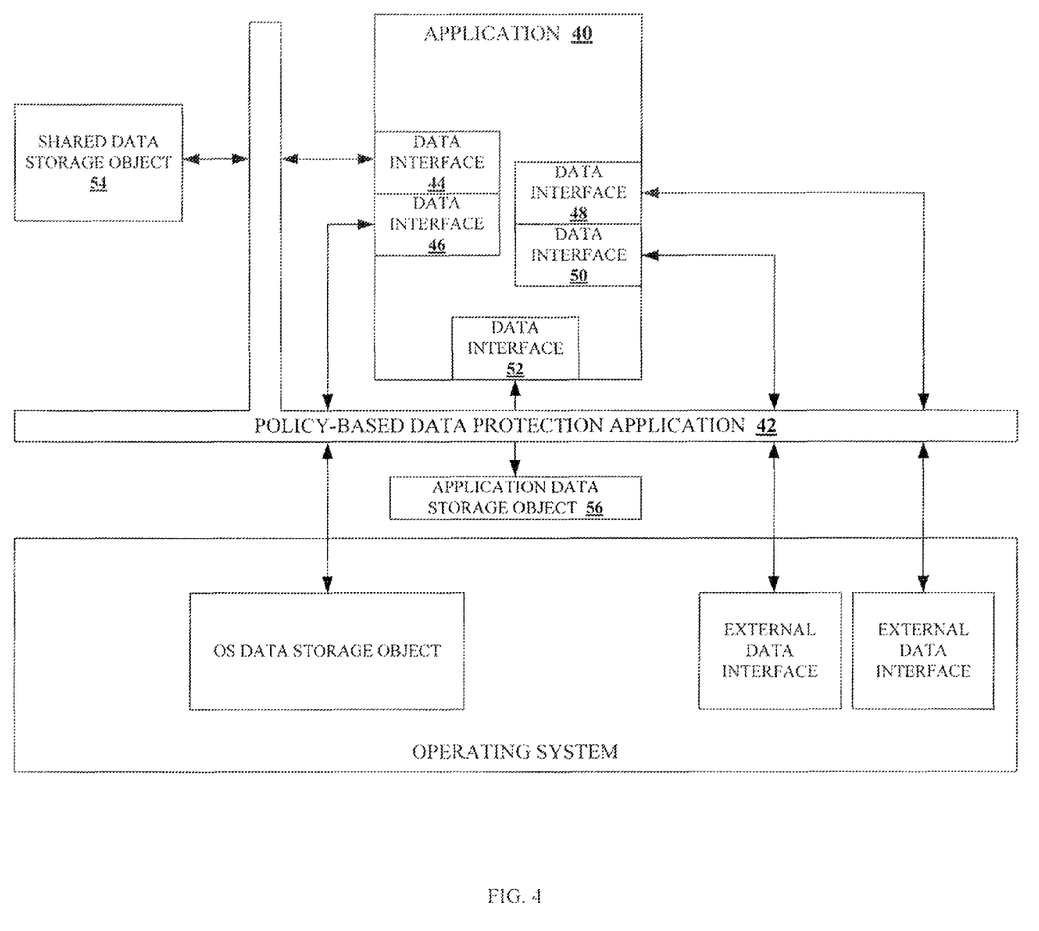
FIG. 4 illustrates an example of an application executing on a computer, under the protection of a data protection policy implemented in a data protection application, according to embodiment of the invention; and, FIG. 5 illustrates several of the techniques used to protect the operational data of an application, consistent with an embodiment of the invention.

FIG. 4 illustrates an example of an application 40 executing on a computer, under the protection of a data protection policy implemented in a data protection application 42. As illustrated in FIG. 4, the application 40 includes several data interfaces (e.g., data interfaces 44, 46, 48, 50, and 52). Each data interface serves as a mechanism by which the application 40 gains access to a data storage object, an external data interface such as a connection to a network or printer, or other peripheral device. Accordingly, a data interface may be a function associated with the application 40, a method associated with an object of the application 40, or any other means by which the operating system or another application can access an application's data. A data interface may have multiple data access methods associated with it. For example, via a single data interface, an application may save, write, copy, delete, print, send, drag-and-drop, or otherwise manipulate data at a data storage object or a data interface. Those skilled in the art will appreciate that a variety of other data access methods may be associated with a particular data interface.

As illustrated in FIG. 4, the data protection application 42 is shown essentially enveloping the application 40 so as to be positioned to monitor and protect access to the application's data. For purposes of illustrating the protective aspects of the invention, the data protection application 42 is shown to represent a sort of protective shield surrounding the application 40. However, in reality, the data protection application 42, which executes as a process on the computing device, monitors various system functions to determine when a data access request has been directed to a particular data interface. For example, the data protection application may register with the operating system to be notified when an application or the operating system is attempting to access a data storage object or data interface associated with the application 40. In this manner, the data protection application 42 serves as a proxy and can intervene before a third-party application or the operating system accesses the operational data of the application.

As illustrated in FIG. 4, in one embodiment of the invention, the data protection application 42 may protect shared data storage objects from being accessed by unknown, unwanted, or unauthorized processes. A shared data storage object may include data associated with a software component, including software components associated with the following technologies: component object model (COM), dynamic data exchange (DDE), browser helper object (BHO) plug-in, ActiveX, and document object model (DOM). Accordingly, when an application is using a shared data storage object 54, the data protection application 42 controls access to the shared data storage object 54 in accordance with the data protection policy, thereby ensuring the operational data of the shared data storage object 54 is protected. Similarly, the application 40 may access and store data at an operating system (OS) data storage object 56, such as a clipboard. The data protection application 42 controls access to the OS data storage object 56 based on the operational data protection policy.

Figure 5:
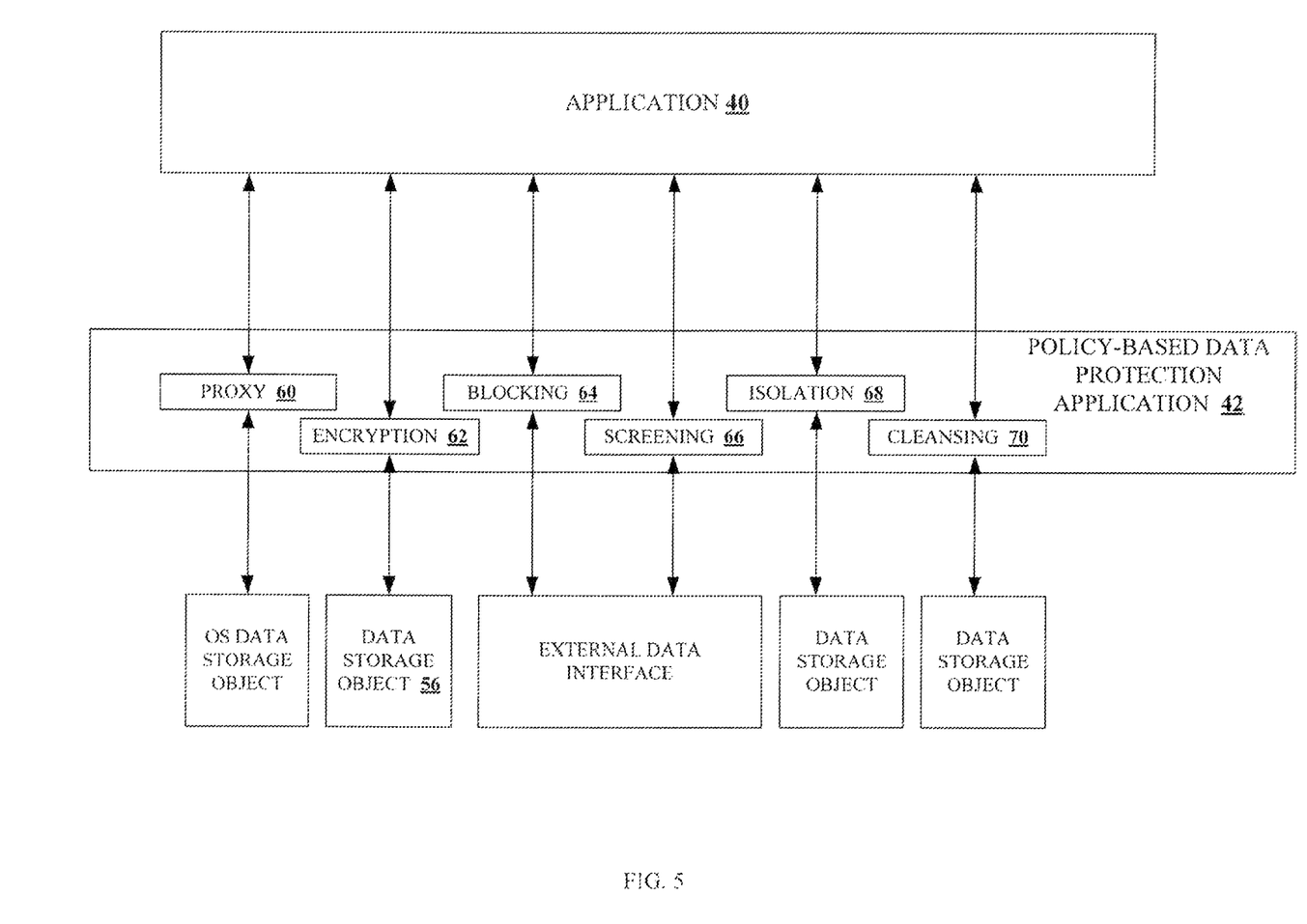

FIG. 5 illustrates several of the techniques used to protect the operational data of an application 40. For example, as illustrated in FIG. 5, the policy-based data protection application 42 secures operational data through such means as: serving as a proxy, encryption, isolation, blocking, screening, and cleansing. It will be appreciated by those skilled in the art that protection mechanisms other than those illustrated in FIG. 5 may be implemented without departing from the spirit of the invention. Broadly speaking, the data protection application 42 acts as a proxy 60 by servicing requests associated with certain data storage objects and data interfaces. The technique or method by which the data protection application 42 registers for, or otherwise intercepts, requests initially directed to a data storage object or data interface will vary depending upon the particular operating system in use. However, once the data protection application 42 has established itself as a proxy for a particular data storage object or data interface, access requests directed to those data storage objects and/or data interfaces will be serviced by the data protection application 42. Accordingly, the data protection application 42 may employ one of many methods in handling a request associated with a particular data storage object or data interface.

As illustrated in FIG. 5, one way in which operational data is protected is via in-line encryption 62. Accordingly, in one embodiment of the invention, when the application 40 makes or processes a request to write data to a data storage object 56, the data protection application 42 intercepts and processes the request. If the policy implemented by the data protection application 42 dictates that data written to the particular data storage object 56 should be encrypted, then the data protection application 42 dynamically generates an encryption key that is used to encrypt the data being written to the particular data storage object. The encryption key is securely stored in memory while it is not being used. When the application issues a request to read data from the particular data storage object, the data protection application 42 decrypts the data with the encryption key before providing the data to the application 40. Other applications are prevented from accessing the encrypted data stored at the data storage object. However, if another application is successful in reading data from the data storage object, the data will be encrypted and consequently will not be usable by the unauthorized application.

Another method of protecting operational data is by isolating 68 a particular data storage object or data interface, such that only the application to which the isolated entity is associated has access to the isolated entity. For example, in one embodiment of the invention, a data storage object associated with an application 40 may be generated such that it is isolated and not accessible by any application other than that which initially requested it. This prevents unauthorized applications from accessing the operational data stored at the isolated data storage object.

In another method of protecting operational data, screening 66 or filtering is used. For example, in one embodiment of the invention, screening 66 is performed to ensure that only certain applications are allowed access to particular data storage objects or data interfaces. The data protection application may include a list of applications that have various access rights to certain data storage objects or data interfaces. Accordingly, access to data storage objects or data interfaces may be dependent upon the application that is requesting access. If the requesting application appears on a list of allowed applications, then the application will be granted access. If not, the application will be denied access.

Another method of protecting operational data involves cleansing 70. Cleansing involves monitoring an application's use of a data storage object, and when the application has finished using the data storage object, the data protection application ensures that no data remains left behind. For example, the data protection application deletes data, destroys the data storage object, or otherwise removes data from the data storage object when the application is through using the data storage object, thereby ensuring that another application cannot access operational data stored at the data storage object.

The foregoing description of various implementations of the invention has been presented for purposes of illustration and description. It is not exhaustive and does not limit the invention to the precise form or forms disclosed. Furthermore, it will be appreciated by those skilled in the art that the present invention may find practical application in a variety of alternative contexts that have not explicitly been addressed herein. Finally, the illustrative processing steps performed by a computer-implemented program (e.g., instructions) may be executed simultaneously, or in a different order than described above, and additional processing steps may be incorporated. The invention may be implemented in hardware, software, or a combination thereof. When implemented partly in software, the invention may be embodied as instructions stored on a computer- or machine-readable medium. In general, the scope of the invention is defined by the claims and their equivalents.

The invention claimed is:

1. A method for protecting operational data, comprising:
    responsive to an attempt to execute an application at a local computing device, determining, by the local computing device, whether or not a current version of a data protection application residing on the local computing device is a most recent version of said data protection application and, if not, downloading, from a distribution server, an updated version of the data protection application to the local computing device, wherein the data protection application is generated at the distribution server and embodies an operational data protection policy established by an administrator; and
    executing the data protection application to secure operational data of an application executing on the local computing device from unauthorized access by another application based on rules defined by the data protection policy,
    wherein
        the operational data is generated by the executing application during an active user session and temporarily stored on the local computing device, the data protection application secures the operational data at least by enabling the executing application to generate an isolated data storage object on the local computing device to store the operational data therein, and the isolated data storage object is isolated and accessible only by the executing application so as to prevent the unauthorized access by another application.

2. The method of claim 1, wherein the data protection application further secures the operational data by enabling particular data access methods used by the executing application to access one or more data storage objects or data interfaces while disabling other data access methods, wherein the particular data access methods that are enabled are selected based on the data protection policy.

3. The method of claim 1, wherein the data protection application further secures the operational data by encrypting data when the executing application writes the data to a data storage object, and decrypting the data when the executing application reads the data from the data storage object, thereby preventing other applications from accessing the data in an unencrypted form.

4. The method of claim 1, wherein the data protection application further secures the operational data by blocking the executing application from a particular data storage object.

5. The method of claim 1, wherein the data protection application further secures the operational data by blocking one or more applications from a particular data storage object while granting one or more applications access to the particular data storage object.

6. The method of claim 1, wherein the data protection application further secures operational data by enabling the executing application to access a data storage object, monitoring the executing application's use of the data storage object, and cleansing the data storage object when the executing application is through using the data storage object.

7. The method of claim 1, wherein the operational data protection policy includes one or more rules defined on a per application basis, so as to differ amongst various applications executing on the local computing device.

8. The method of claim 1, wherein the operational data protection policy includes one or more rules defined on a per data access method basis, so as to enable access to one or more data storage objects via a particular data access method while disabling access to the one or more data storage objects via other data access methods.

9. A computer-readable storage medium storing instructions, which, when executed by a computer, cause the computer to perform a method, said method comprising:
    responsive to an attempt to execute an application at a local computing device, determining whether or not a current version of a data protection application residing on the local computing device is a most recent version of said data protection application and, if not, downloading, from a distribution server, an updated version of the data protection application to the local computing device, wherein the data protection application is generated at the distribution server and embodies an operational data protection policy established by an administrator; and
    executing the data protection application to secure operational data of an application executing on the local computing device from unauthorized access by another application based on rules defined by the data protection policy,
    wherein the operational data is generated by the executing application during an active user session and temporarily stored on the local computing device, the data protection application secures the operational data at least by enabling the executing application to generate an isolated data storage object on the local computing device to store the operational data therein, and the isolated data storage object is isolated and accessible only by the executing application so as to prevent the unauthorized access by another application.

10. The computer-readable storage medium of claim 9, wherein the data protection application further secures the operational data by enabling particular data access methods used by the executing application to access one or more data storage objects or data interfaces while disabling other data access methods, wherein the particular data access methods that are enabled are selected based on the data protection policy.

11. The computer-readable storage medium of claim 9, wherein the data protection application further secures the operational data by encrypting data when the executing application writes the data to a data storage object, and
   decrypting the data when the executing application reads the data from the data storage object, thereby preventing other applications from accessing the data in an unencrypted form.

12. The computer-readable storage medium of claim 9, wherein the data protection application further secures the operational data by blocking the executing application from a particular data storage object.

13. The computer-readable storage medium of claim 9, wherein the data protection application further secures the operational data by blocking one or more applications from a particular data storage object while granting one or more applications access to the particular data storage object.

14. The computer-readable storage medium of claim 9, wherein the data protection application further secures the operational data by enabling the executing application to access a data storage object, monitoring the executing application's use of the data storage object, and cleansing the data storage object when the executing application is through using the data storage object.

* * * * *